US010089342B2

(12) United States Patent
Sherkat et al.

(10) Patent No.: US 10,089,342 B2
(45) Date of Patent: Oct. 2, 2018

(54) MAIN MEMORY DATABASE MANAGEMENT USING PAGE INDEX VECTORS

(71) Applicants: Reza Sherkat, Waterloo (CA); Guenter Radestock, Karlsruhe (DE); Ivan Schreter, Malsch (DE); Colin Florendo, Marlborough, MA (US); Mihnea Andrei, Issy les Moulineaux (FR); Anil Kumar Goel, Waterloo (CA)

(72) Inventors: Reza Sherkat, Waterloo (CA); Guenter Radestock, Karlsruhe (DE); Ivan Schreter, Malsch (DE); Colin Florendo, Marlborough, MA (US); Mihnea Andrei, Issy les Moulineaux (FR); Anil Kumar Goel, Waterloo (CA)

(73) Assignee: SAP SE, Walldorf (DE)

( * ) Notice: Subject to any disclaimer, the term of this patent is extended or adjusted under 35 U.S.C. 154(b) by 705 days.

(21) Appl. No.: 14/328,511

(22) Filed: Jul. 10, 2014

(65) Prior Publication Data

US 2016/0012089 A1 Jan. 14, 2016

(51) Int. Cl.
*G06F 17/30* (2006.01)
(52) U.S. Cl.
CPC .. *G06F 17/30324* (2013.01); *G06F 17/30153* (2013.01); *G06F 17/30315* (2013.01)
(58) Field of Classification Search
CPC ......... G06F 17/30619; G06F 17/30312; G06F 17/3024; G06F 17/30153; G06F 17/30315
See application file for complete search history.

(56) References Cited

U.S. PATENT DOCUMENTS

| 5,794,229 A * | 8/1998 | French ............. G06F 17/30324 |
| 6,654,868 B2 * | 11/2003 | Tamatsu ........... G06F 17/30312 |
| | | 707/E17.005 |
| 7,996,387 B2 * | 8/2011 | Das .................. G06F 17/30312 |
| | | 707/715 |
| 9,286,335 B1 * | 3/2016 | Benton, Jr. ....... G06F 17/30312 |

(Continued)

OTHER PUBLICATIONS

Wiam Al Hayek, An Effective Method for Data Compression Based on Adaptive Character Wordlength, Jun. 2012, International Arab Journal of e-Technology, vol. 2, No. 4, Jun. 2012.*

(Continued)

*Primary Examiner* — Robert Beausoliel, Jr.
*Assistant Examiner* — Hau H Hoang
(74) *Attorney, Agent, or Firm* — Brake Hughes Bellermann LLP

(57) ABSTRACT

A compression manager may store, within an index vector, a plurality of value identifiers (IDs), each value ID representing a value within a database. A page generator may designate a number of the value IDs as defining a page within the index vector, so that the index vector includes a plurality of pages, each page including the number of value IDs. The page generator may store the index vector in a secondary memory of a main memory database. An iterator may access a requested value ID, and a page loader may load a corresponding page of the index vector that contains the requested value ID into the main memory database.

12 Claims, 4 Drawing Sheets

(56) References Cited

U.S. PATENT DOCUMENTS

| | | | |
|---|---|---|---|
| 2010/0030796 A1* | 2/2010 | Netz | G06F 17/30501 |
| | | | 707/756 |
| 2012/0166402 A1* | 6/2012 | Pederson | G06F 17/30312 |
| | | | 707/692 |
| 2015/0142819 A1* | 5/2015 | Florendo | G06F 17/30312 |
| | | | 707/741 |
| 2016/0098436 A1* | 4/2016 | Nath | G06F 17/30613 |
| | | | 707/741 |

OTHER PUBLICATIONS

Ventana Research, Secrets Revealed in Columnar Database Technology, Mar. 4, 2011, available at: https://blog.ventanaresearch.com/2011/03/04/secrets-revealed-in-columnar-database-technology/.*
Ben Nadel, Creating Repeated Sequences with the Modulus (MOD) Operator, Aug. 10, 2011, available at: http://www.bennadel.com/blog/2240-creating-repeated-sequences-with-the-modulus-mod-operator.htm.*

* cited by examiner

Page 1
220

Page 2
226

US 10,089,342 B2

MAIN MEMORY DATABASE MANAGEMENT USING PAGE INDEX VECTORS

TECHNICAL FIELD

This description relates to main memory database management.

BACKGROUND

Main memory databases, also referred to as in-memory databases, or resident memory databases, refer generally to databases that rely on a computer system's main memory for data storage, as opposed, for example, to the disk-based storage relied upon by traditional database systems. Main memory databases, particularly in certain computing contexts, are well-known to provide faster and more predictable access to data than conventional disk-based databases.

Many current hardware and software components contribute to the success of main memory databases. For example, modern computing systems might include multiple CPU cores for parallel processing, very large main memories, large available caches, and high levels of compression of database content. Nonetheless, even as such computing infrastructure has enabled larger and larger main memory databases, businesses and other users have desired the features and advantages of main memory databases for analysis of datasets so large that conventional main memory databases become partially or completely incapable of processing the desired volumes of data with sufficiently fast and predictable response times.

Consequently, in such environments, main memory databases may be unable to fully meet expectations of their users. For example, customers and other users of main memory databases in such environments may be unable to fully utilize desired features and advantages of such conventional main memory database systems.

SUMMARY

According to one general aspect, a system may include instructions recorded on a computer-readable medium, and executable by at least one processor. The system may include a compression manager configured to cause the at least one processor to store, within an index vector, a plurality of value identifiers (IDs), each value ID representing a value within a database, and a page generator configured to cause the at least one processor to designate a number of the value IDs as defining a page within the index vector, so that the index vector includes a plurality of pages, each page including the number of value IDs, the page generator being further configured to cause the at least on processor to store the index vector in a secondary memory of a main memory database. The system may further include an iterator configured to cause the at least one processor to access a requested value ID, and a page loader configured to cause the at least one processor to load a corresponding page of the index vector that contains the requested value ID into the main memory database.

According to another general aspect, a computer-implemented method for executing instructions stored on a computer readable storage medium may include storing, within an index vector, a plurality of value IDs, each value ID representing a value within a database. The method may further include designating a number of the value IDs as defining a page within the index vector, so that the index vector includes a plurality of pages, each page including the number of value IDs, storing the index vector in a secondary memory of a main memory database; and accessing a requested value ID, including loading a corresponding page of the index vector that contains the requested value ID into the main memory database.

According to another general aspect, a computer program product may be tangibly embodied on a non-transitory computer-readable storage medium and may include instructions that, when executed by at least one computing device, are configured to cause the at least one computing device to store, within an index vector, a plurality of value IDs, each value ID representing a value within a database. The instructions, when executed by the at least one computing device, may be further configured to cause the at least one computing device to designate a number of the value IDs as defining a page within the index vector, so that the index vector includes a plurality of pages, each page including the number of value IDs, store the index vector in a secondary memory of a main memory database, and access a requested value ID, including loading a corresponding page of the index vector that contains the requested value ID into the main memory database.

The details of one or more implementations are set forth in the accompanying drawings and the description below. Other features will be apparent from the description and drawings, and from the claims.

DETAILED DESCRIPTION

Figure 1:
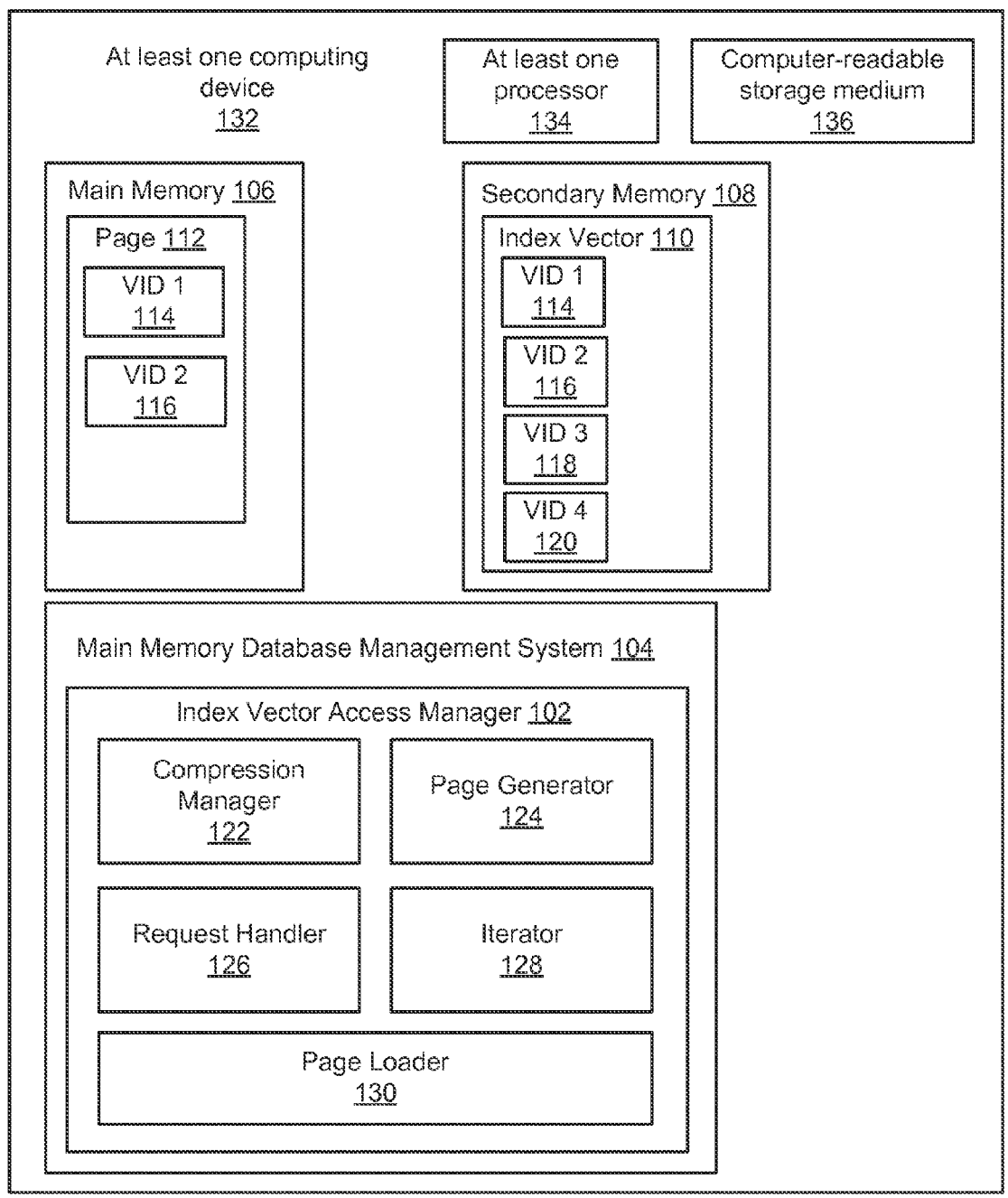
FIG. 1 is a block diagram of a system for main memory database management using paged index vectors.

FIG. 1 is a block diagram of a system 100 for management of a main memory database using paged index vectors. In the example of FIG. 1, an index vector access manager 102 is illustrated as a component of a main memory database management system 104. In the example of FIG. 1, a main memory 106 is illustrated which may be used to implement a main memory database as referenced above. In example scenarios in which extremely large databases are utilized, a secondary memory 108 may be utilized for storage of data that is not currently being loaded and accessed, or that is not likely to be accessed in the near future.

In the example of FIG. 1, as illustrated, the secondary memory 108 may store an index vector 110, which, as explained in detail below, represents a column data representation using dictionary compression and n-bit compression. In order to access data stored using the index vector 110, the main memory database management system 104 may be configured to load appropriate portions of the index vector 110 into the main memory 106. More specifically, as described in detail below, the index vector access manager 102 may be configured to load a portion of the index vector 110 referred to herein as page 112, or index vector page 112, in a manner that ensures fast and reliable access to data reference therein.

More specifically, as also illustrated in the example of FIG. 1, the index vector 110 may include a vector of value IDs illustrated as VID1 114, VID2 116, VID3 118 and VID4 120. As described and illustrated below with respect to FIGS. 2A and 2B, the value identifiers 114-120, as their name implies, represent identifiers for database values, which are thus represented within the index vector 110, using otherwise-conventional dictionary compression techniques. In other words, the index vector 110 represents a vector of the value IDs 114-120, each of which corresponds to an identifier value from the dictionary within the dictionary compress scheme.

In the example of FIG. 1, the page 112 is illustrated as including the value identifier 114 and the value identifier 116. In particular, the index vector access manager 102 may be configured to ensure that the page 112 includes whole or entire values for any value identifiers included therein. In other words, the index vector access manager 102 may be configured to avoid scenarios in which only a portion of any value identifier is included within the page 112. Moreover, the index vector access manager 102 may be configured to identify a desired value identifier, or range of value identifiers, from within what might be a very large index vector. Thus, it may be appreciated that, from a perspective of a user of the system 100, desired data values (and associated operations) may be obtained in a fast and reliable manner, even in a context in which a quantity of data to be accessed is extremely large, compared to the available main memory.

In order to provide the various features and advantages referenced above, the index vector access manager 102 is illustrated as including various components 122-130. Specifically, the index vector access manager 102 may include a compression manager 122 that is configured to execute one or more compression schemes with respect to the data to be processed using the main memory 106.

In this regard, and as may be understood in more detail with respect to the below description of FIGS. 2A and 2B, it may be appreciated that certain types of data and/or data access and data storage may be particularly amendable for use in a main memory database, and/or may be particularly compatible with various types of compression schemes.

For example, many traditional disk-based database systems store data as a plurality of records, in which each such record is included within a row of a database, and associated columns each include individual attributes of each record/row. For example, a traditional customer database might include a plurality of customer records, where each row represents a customer, and each column represents attributes of customers, such as age, address, or annual income.

However, the same data may be represented as a column store, in which tables are stored by column, not row. For example, in the above example, data may be stored by the column "age," or by the column "annual income."

Such columnar databases may be, in many cases, particularly suitable for use in the context of a main memory database. For example, a user may wish to execute various types of data analysis with respect to the values of just one or a few columns. Moreover, in many cases, values within even a very large column of data may exist within a relatively narrow range. For example, in the examples just mentioned, a customer database may include millions of customers, yet the customers all may have ages or annual incomes within certain known ranges. Consequently, such data may be particularly suited for high compression rates.

As already mentioned, operations of the compression manager 122 in implementing dictionary compression and n-bit compression are described and illustrated below with respect to FIGS. 2A and 2B. For purposes of general understanding of FIG. 1, however, it may be appreciated that the compression manager 122 ultimately represents individual value IDs 114-120 using a predefined number of individual bits of data for each. These data bits may then be stored within the index vector 110, as shown in FIG. 1.

A page generator 124 may be configured to define pages of the index vector 110 as having a page size which ensures that value identifiers within a given page are included in their entireties, e.g., that no partial or incomplete value identifier is erroneously loaded into the main memory 106 as part of the loaded page 112. Once such pages have been defined, a request handler 126 may proceed to accept requests from a user of the system 100 for desired data or data operations.

For example, in a simple example, a user may request customers within a certain range of ages or incomes. More generally, it is not necessary for a user to request an output of particular data. For example, a user may instead request certain conventional database operations to be performed with respect to specified value identifiers. For example, a user may execute a join or merge operation with respect to the specified value identifiers, without ever actually retrieving the corresponding data values corresponding to the value identifiers being operated upon.

Thus, for example, the request handler 126 may receive a specific row position, or range of row positions, corresponding to certain value identifiers of the index vector 110. Then, an iterator 128 may be configured to iterate through pages of the index vector 110, until arriving at a page, or range of pages, which include the value identifier(s) corresponding to the specified row position(s) received by way of the request handler 126.

More specifically, and again as explained in detail below, the iterator 128 may rely upon knowledge obtained from the page generator 124 with respect to the predefined page size used by the page generator 124 in creating the pages of the index vector 110. The iterator 128 may use this page size information in conjunction with the requested row position and knowledge of a size in bytes of each individual page, and the number of bits encoding, to thereby perform division in modulo to identify a start and end point of a page containing the referenced row position (or range of pages containing a referenced range of row positions).

Upon such identification and selection of one or more desired pages, a page loader 130 may be configured to load the identified page or pages from the secondary memory 108 into the main memory 106. For example, as shown in FIG. 1, the page loader 130 may pin the page 112 of the index vector 110, including the value identifiers 114, 116, into the main memory 106. Thereafter, the database management system 104 may proceed to execute whatever database operations may be specified or requested by the user of the system 100.

For purposes of illustration in the simplified example of FIG. 1, the system 100 is illustrated as being executed using at least one computing device 132, which may include at least one processor 134 and non-transitory computer readable storage medium 136. That is, the system 100 should be understood to include a computing device, or a plurality of computing devices in communication with one another, using at least one processor 134, which, as referenced above, might represent two or more processing cores executing in parallel. The non-transitory computer readable storage medium 136 similarly represents one or more standard types of memory that might be used in the system 100, including, of course, the main memory 106 and the secondary memory 108. Of course, the non-transitory computer readable storage medium 136 also may be configured to store instructions which, when executed by the at least one processor 134, are configured to implement the database management system 104 and the index vector access manager 102.

Further, it may be appreciated that, although various individual components are illustrated in the example of FIG. 1, any such individual component, may, in other example implementations, be implemented as two or more subcomponents. Conversely, any two or more subcomponents illustrated in FIG. 1 may be executed using a single component providing all of the functionalities of such combined components.

Figure 2A:
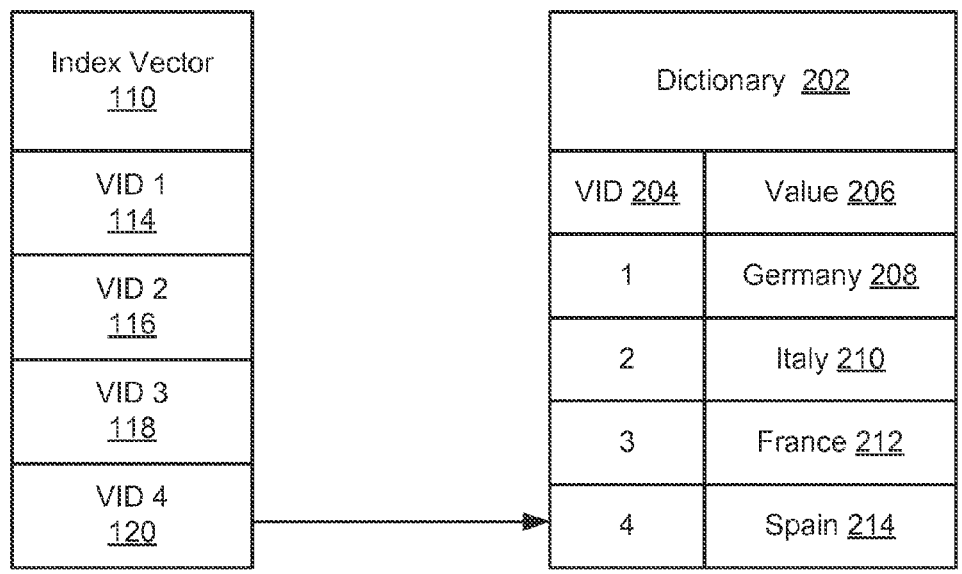
FIG. 2A is an example of an index vector using dictionary compression.
Figure 2B:
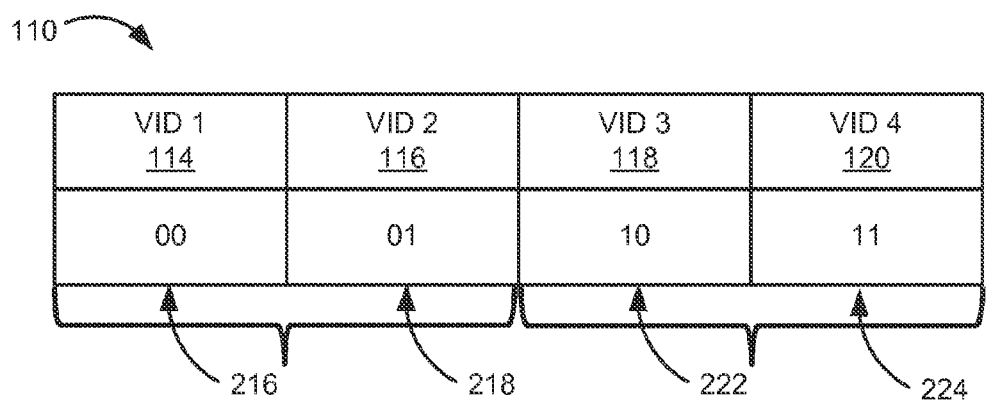
FIG. 2B is an example of pages of the index vector of FIG. 2A.

FIGS. 2A and 2B illustrate example use contexts and associated operations of the compression manager 122 and the page generator 124. Specifically, in FIG. 2A, a dictionary compression scheme that might be used by the compression manager 122 is illustrated.

In the example, a dictionary 202 is illustrated as including a column 204 of value identifiers, as well as a column 206 of corresponding values. In the example, a value and associated value identifier 208 corresponds to a value "Germany." Similarly, a value/value ID 210 refers to "Italy," while a value/value ID 212 refers to "France," and a value/value ID 214 refers to a value "Spain." Thus, for example, in the customer database referenced above, it may occur that a column attribute exists for country of residence of each customer. As referenced above, in the context of a columnar data store, it may be appreciated that, even for a customer database for millions of customers, a number of countries of residence for the customers may be relatively limited. Therefore, in the dictionary compression scheme of FIG. 2A, each such country of residence may be associated with a corresponding value identifier, and, rather than using the full spelling of each country, individual countries may be represented by corresponding value identifiers. Moreover, since, as just referenced, a total number of countries may be small relative to a total number of customers, a finite and relatively small number of bits may be required to represent each such value identifier.

For example, in the simplified example of FIGS. 2A and 2B, only four value identifiers are included within the dictionary 202, so that only two bits of data are required to represent the four possible values (assuming, for the sake of simplicity of the example, that the column does not take the null value, which case a valueID for the null value would be needed). Consequently, as shown in FIG. 2B, the value identifier 114 may be represented using bits 00, as shown in field 216. Similarly, the value identifier 116 may be represented as 01, as shown in field 218. The value identifier 118 may be represented as 10 in field 222, while the value identifier 120 may be represented as 11, as shown in field 224.

Referring back to FIG. 2A, it is apparent that the index vector 110 represents, as shown, a vector of the value IDs 114-120. Thus, FIGS. 2A and 2B clearly illustrate examples of why use of the index vector 110 is advantageous in the context of the system 100, e.g., it is only necessary to load the relatively small number of bits required to represent the relevant value identifiers into the main memory 106 in order to be able to access and manipulate the actual underlying data values.

In addition to the types of dictionary compression schemes just described, and as also referenced above, the compression manager 122 may be configured to implement an n-bit compression scheme with respect to the value identifiers 114-120. For example, the at least one computing device 132 may have a 32-bit architecture, or a 64-bit architecture. In this context, as well known, the classification of computing devices to architectures of predefined bit sizes generally refers to the use of a corresponding number of bits as a word size that defines, e.g., corresponding classes of busses, memory, and CPUs, and, consequently, the software executed therewith.

The use of such relatively large word sizes in modern computer architectures has proven to be extremely valuable in, e.g., increasing processing speeds of associated computing systems. For example, a computing system with a 64-bit architecture may include a 64-bit register capable of storing over 18 quintillion different values. However, as just described, it may frequently occur, e.g., in the realm of main memory databases using columnar data stores and dictionary compression, that value identifiers to be loaded into the main memory 106 may have a relatively limited range of possible values. Thus, an n-bit compression scheme recognizes that a use of, e.g., a 64-bit architecture to load corresponding, individual values (i.e., data bits representing each individual value identifier) may be highly inefficient, since many fewer bits of data are required to represent each value identifier, compared to, e.g., the 64 available bits in a 64-bit architecture.

Consequently, the compression manager 122 may be configured to consider a total number of bits required to represent all value identifiers within the dictionary 202, where, as described, the value identifiers may be assigned as contiguous integer values. For example, as described above, in the simplified example of FIG. 2A, only four value identifiers are included, so that, as shown in FIG. 2B, only two bits of data are required for each such value identifier. Therefore, the compression manager 122 may load, in the example, and assuming a 64-bit architecture, 32 different value identifiers at a time. As a result, such n-bit compression techniques are useful in fitting more value identifiers into available bits, thereby minimizing a number of required reads of cache lines/words.

Thus, it may be appreciated from FIGS. 1, 2A, 2B that value identifiers may be coded using n-bit compression to reduce an overall storage footprint of each value, and to improve the performance of evaluating queries on a corresponding index vector. Nonetheless, in the types of extremely large databases referenced above (e.g., enterprise resource planning (ERP) databases), an index vector may yet require an extremely large memory, so that even n-bit compression of the index vector is not sufficiently effective. That is, for example, loading the entire index vector beyond a certain size in order to retrieve value(s) for a single (or a few) row positions may become extremely inefficient and impractical.

In such situations, the index vector access manager 102 enables the database management system 104 to provide on-demand paging of the index vector 110, so as to load the individual pages (e.g., portions, or sections) of the compressed index vector when required by a user of the system 100. In order to be sufficiently useful, such on-demand paging requires stability of the pages while value identifiers of a requested page are accessed. As may be appreciated from the simplified example of FIG. 2B, when n-bit compression utilizes such on-demand paging, a compressed value identifier may potentially span more than one compressed page, in which case the page loaded to the main memory 106 may include only a portion of a particular value identifier. In such scenarios, access to a compressed page may become complicated, and in-memory stability of the compressed page may be reduced.

To avoid the difficulties referenced above, the page generator 124 may be configured to encode value identifiers on each index page as a predefined number of compressed value identifiers, where the predefined number is independent from the number of bits required to represent all of the value identifiers. For example, the page generator 124 may encode the value identifiers on each index page as groups of 64 compressed value identifiers. In such examples, it may be appreciated that any required number of bits and each value identifier multiplied by, in the example, 64, will result in a complete (i.e., full) word encoding, when the word length is 64 bits.

Then, knowing the number defining a group of compressed value identifiers, a number of bits in each value identifier, and a requested row position received by way of the request handler 126, the iterator 128, representing an n-bit compression aware iterator, will provide access to the page. In other words, iterator 128 effectively serves as an access layer for the page index vector 110, and is repositioned to a correct, desired index vector page which contains a requested value identifier (or range of value identifiers). Then, the page loader 130 may proceed to load and pin the obtained index vector page(s) in main memory 106.

More detailed discussion of example operations of the iterator 128 are provided below with respect to FIGS. 3 and 4. Nonetheless, it may be appreciated from the above description that the index vector access manager 102 prevents any splitting or fragmentation of any value identifiers between two compressed pages, so that the value identifiers on each pinned page within the main memory 106 may be read in a highly stable manner, irrespective of any paging in or paging out of other compressed pages. Furthermore, the iterator 128 may page in a desired compressed index page on-demand, while hiding operations related to the n-bit compression by compressing in the written VID value identifiers, and decompressing out the read value identifiers.

Figure 3:
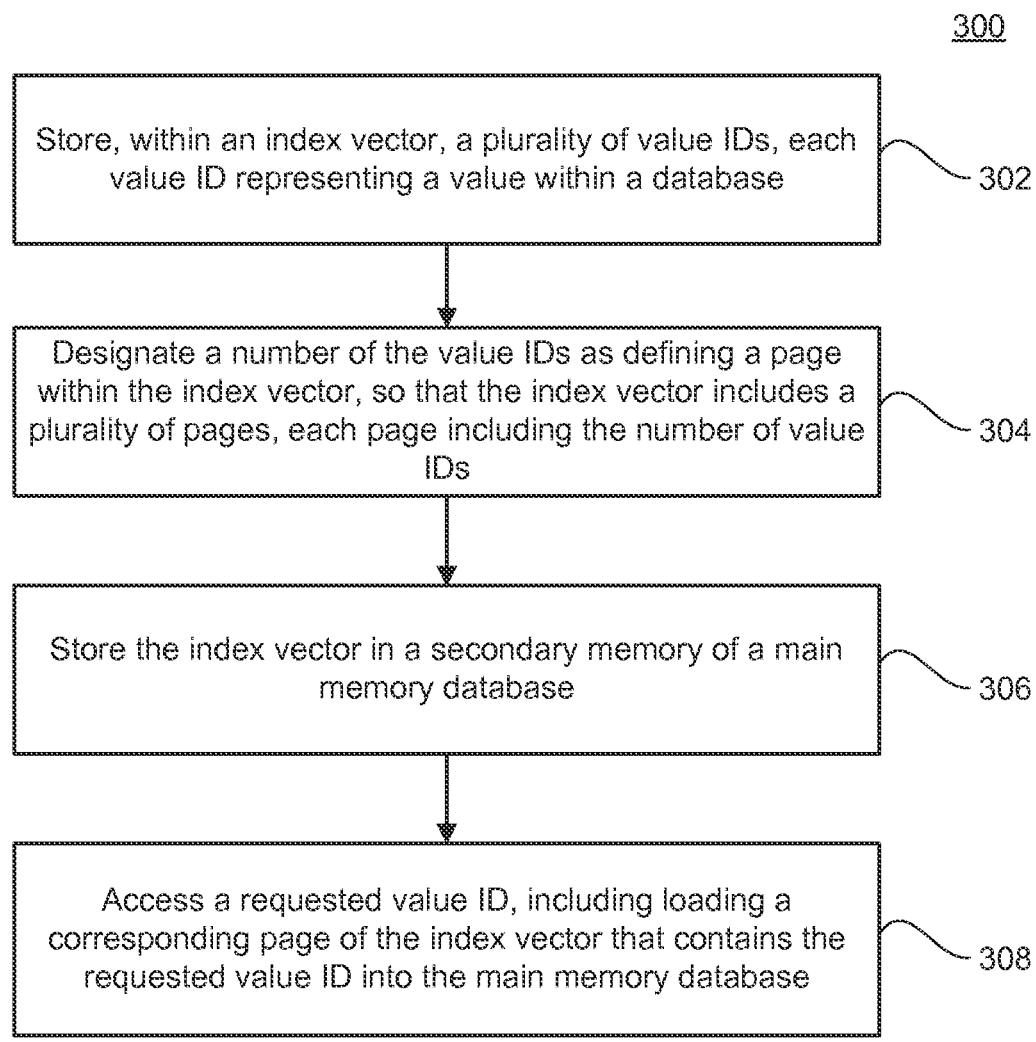
FIG. 3 is a flowchart illustrating example operations of the system of FIG. 1.

FIG. 3 is a flowchart 300 illustrating example operations of the system 100 of FIG. 1. In the example of FIG. 3, operations 302-308 are illustrated as separate, sequential operations. However, it may be appreciated that, in additional or alternative implementations, any two or more of the operations 302-308 may be implemented in a partially or completely overlapping or parallel manner, or in a nested, iterative, looped, or branched fashion. In such implementations, additional operations or sub-operations may be included, while one or more operations may be omitted.

In the example of FIG. 3, a plurality of value identifiers may be stored within an index vector, each value identifier representing a value within a database (302). For example, the compression manager 122 of the index vector access manager 102 may store the value IDs 114-120 within the index vector 110. As referenced above, the resulting index vector may thus be understood to represent a contiguous, linear representation of a column of a columnar database, including fixed-size imagers for value identifiers included therein.

A number of the value identifiers may be designated as defining a page within the index vector, so that the index vector includes a plurality of pages, each page including the number of value identifiers (304). For example, the page generator 124 may be configured to encode the value identifiers on each such index vector page as a number or group of 64 compressed value identifiers, without limitation on a quantity of bits that might be included within each individual value identifier (since the quantity of bits within each value identifier is set instead by a required number of bits determined by the compression manager 122 to implement an n-bit compression scheme). In the example just referenced, use of the number 64 as the number of value identifiers defining a group implies that the pages, irrespective of the number of bits of data within each value identifier, will be the same in terms of number of bytes of data (e.g., in the simplified example of FIG. 2B above, for the two-bit value identifiers, the four value identifiers would result in a page with groups of 128 bits, or 16 bytes).

The index vector may be stored in the secondary memory of a main memory database (306). For example, the index vector 110 may be stored within the secondary memory 108.

A requested value identifier may be accessed, including loading a corresponding page of the index vector that contains the requested value identifier into the main memory of the main memory database (308). For example, as referenced above, the request handler 126 may receive a request for a row position or range of row positions, whereupon the iterator 128 may calculate a corresponding page or pages which may contain the requested value identifier or range of value identifiers. Then, the page loader 130 may proceed to load the identified index vector pages into the main memory 106, including pinning the page or pages in main memory 106 to ensure a location thereof for as long as may be required or used by the user of the system 100. In scenarios in which the identified page is already within the main memory 106, the page loader 130 may increment a use count for the page to ensure that the page remains in the main memory while needed by the user of the system 100.

Figure 4:
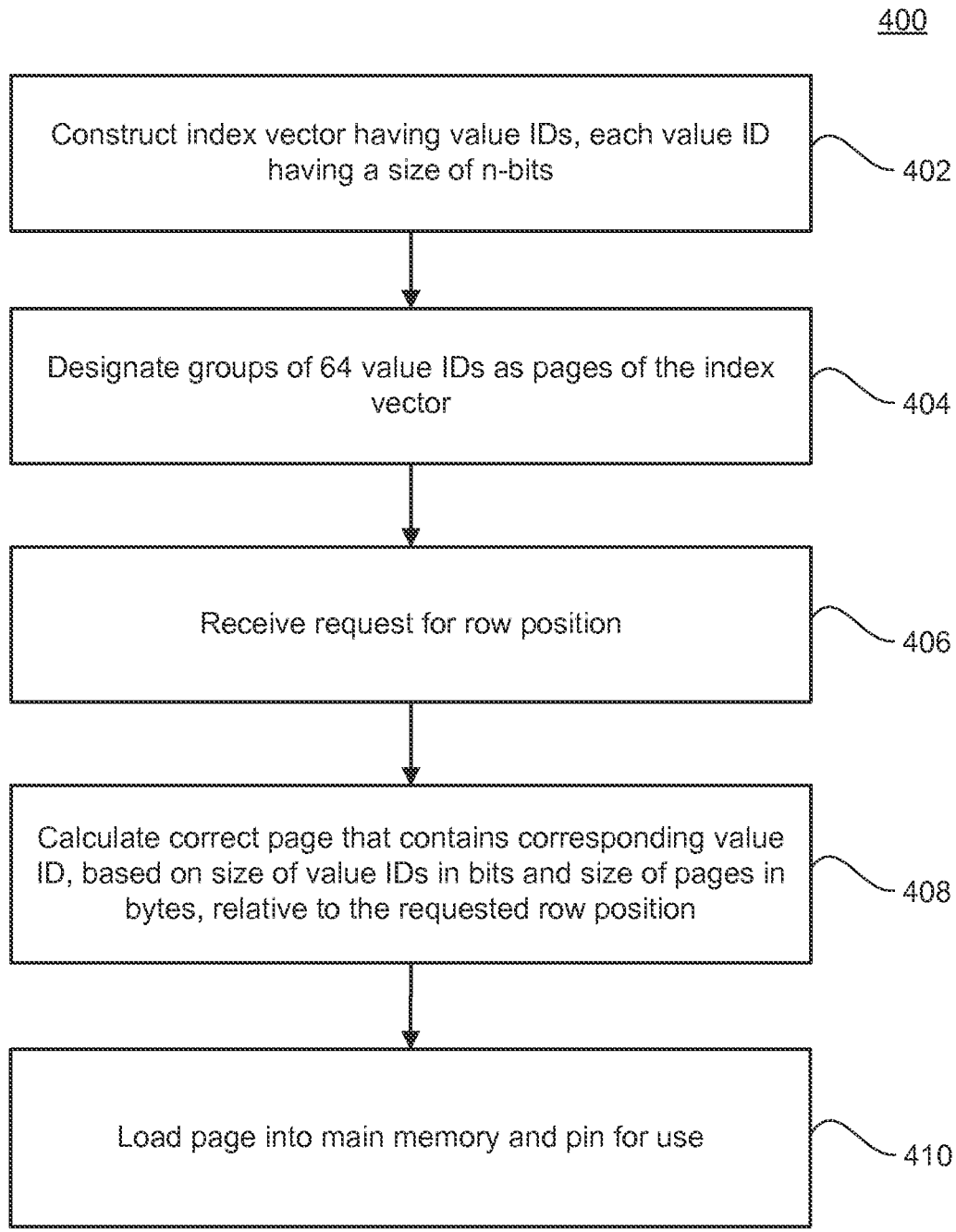
FIG. 4 is a more detailed example flowchart illustrating particular implementations of the system of FIG. 1.

FIG. 4 is a flowchart 400 illustrating more detail example operations of the system 100 of FIG. 1. In the example of FIG. 4, an index vector having value identifiers may be constructed, each value identifier having a fixed size of n-bits (402). In the example of FIG. 4, as referenced above, the groups of 64 value identifiers may be designated as pages of the index vector (404).

Thereafter, upon receiving a request specifying a row position (406), a correct page containing a corresponding value identifier for the requested row position may be calculated, based on the fixed size of the value identifiers in bits and the size of each index vector page in bytes, relative to the requested row position (408). For example, as referenced above, the iterator 128 may perform division in modulo to discover a whole number of index vector pages occurring prior to a start of the requested index vector page.

In this way, the requested index vector page may be presumed to be the next consecutive index vector page, and the thus-determined index vector page may be loaded into the main memory and pinned for use therein (410), as referenced above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Non-transitory information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
    at least one processor; and
    a non-transitory computer-readable storage medium configured to store instructions executable by the at least one processor;
    a main memory of a main memory database; and
    a secondary memory of a main memory database, the system further including
    a compression engine configured to cause the at least one processor to store, within an index vector and within the secondary memory, a plurality of value identifiers (IDs), each value ID representing a value within a database, wherein the compression engine is further configured to cause the at least one processor to implement a dictionary compression scheme in which the value is stored in a dictionary, and an n-bit compression scheme in which a number of bits required per value ID in order to store all the value IDs within the index vector is calculated;
    a page generation engine configured to cause the at least one processor to designate a number of the value IDs stored within the secondary memory as defining a page within the index vector, so that the index vector includes a plurality of pages, each page including the number of value IDs, wherein the number of the value IDs corresponds to including only entire value IDs within the page;
    an iteration engine configured to cause the at least one processor to access a requested value ID from within the secondary memory, including identifying the page from among the plurality of pages, based on the number of bits required per value ID according to the n-bit compression scheme, as well as a size of each page; and
    a page loader configured to cause the at least one processor to load the page of the index vector that contains the requested value ID from the secondary memory into the main memory of the main memory database.

2. The system of claim 1, wherein the values include column values of at least one columnar database.

3. The system of claim 2, further comprising a request handler configured to cause the at least one processor to receive a requested row position corresponding to a row of the columnar database from a user of the main memory database by way of a user interface thereof.

4. The system of claim 3, wherein the iteration engine is configured to cause the at least one processor to locate the page, including performing division in modulo to find an end position of a preceding page immediately prior to the page.

5. The system of claim 3, wherein the request handler is configured to cause the at least one processor to receive a range of row positions, and wherein the iteration engine is further configured to cause the at least one processor to identify and retrieve a range of value identifiers corresponding to the range of row positions.

6. The system of claim 1, wherein the number of value IDs per page is independent of the number of bits per value ID.

7. A computer-implemented method for executing instructions stored on a computer readable storage medium, the method comprising:
    storing, within an index vector, a plurality of value IDs, each value ID representing a value within a database, including implementing a dictionary compression scheme in which the value is stored in a dictionary, and implementing an n-bit compression scheme in which a number of bits required per value ID in order to store all the value IDs within the index vector is calculated;
    designating a number of the value IDs as defining a page within the index vector, so that the index vector includes a plurality of pages, each page including the number of value IDs, wherein the number of the value IDs corresponds to including only entire value IDs within each page;

storing the index vector in a secondary memory of a main memory database;

accessing a requested value ID, including identifying a corresponding page from among the plurality of pages, based on the number of bits required per value ID according to the n-bit compression scheme, as well as a size of each page; and loading the corresponding page of the index vector that contains the requested value ID into the main memory database.

8. The method of claim 7, wherein the values include column values of at least one columnar database, the method further comprising receiving a requested row position corresponding to a row of the columnar database.

9. The method of claim 7, further comprising locating the corresponding page, including performing division in modulo to find an end position of a preceding page immediately prior to the corresponding page.

10. A computer program product, the computer program product being tangibly embodied on a non-transitory computer-readable storage medium and comprising instructions that, when executed by at least one computing device, are configured to cause the at least one computing device to:

store, within an index vector, a plurality of value IDs, each value ID representing a value within a database;

implement a dictionary compression scheme in which the value is stored in a dictionary, and an n-bit compression scheme in which a number of bits required per value ID in order to store all the value IDs within the index vector is calculated;

designate a number of the value IDs as defining a page within the index vector, so that the index vector includes a plurality of pages, each page including the number of value IDs, wherein the number of the value IDs corresponds to including only entire value IDs within each page;

store the index vector in a secondary memory of a main memory database;

access a requested value ID, including identifying a corresponding page from among the plurality of pages, based on the number of bits required per value ID according to the n-bit compression scheme, as well as a size of each page; and the corresponding page of the index vector that contains the requested value ID into the main memory database.

11. The computer program product of claim 10, wherein the values include column values of at least one columnar database, and wherein the instructions, when executed, are configured to receive a requested row position corresponding to a row of the columnar database.

12. The computer program product of claim 10, wherein the instructions, when executed, are configured to locate the corresponding page, including performing division in modulo to find an end position of a preceding page immediately prior to the corresponding page.

* * * * *